(12) United States Patent
Dezfulian et al.

(10) Patent No.: US 11,531,164 B2
(45) Date of Patent: Dec. 20, 2022

(54) HYBRID EDGE COUPLERS WITH LAYERS IN MULTIPLE LEVELS

(71) Applicant: GLOBALFOUNDRIES U.S. Inc., Santa Clara, CA (US)

(72) Inventors: Kevin K. Dezfulian, Arlington, VA (US); Yusheng Bian, Ballston Lake, NY (US); Kenneth J. Giewont, Hopewell Junction, NY (US); Karen Nummy, Newburgh, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 62 days.

(21) Appl. No.: 17/169,971

(22) Filed: Feb. 8, 2021

(65) Prior Publication Data

US 2022/0252790 A1    Aug. 11, 2022

(51) Int. Cl.
| | |
|---|---|
| *G02B 6/30* | (2006.01) |
| *G02B 6/124* | (2006.01) |
| *G02B 6/122* | (2006.01) |
| *G02B 6/14* | (2006.01) |
| *G02B 6/136* | (2006.01) |
| *G02B 6/125* | (2006.01) |

(52) U.S. Cl.
CPC ............ *G02B 6/305* (2013.01); *G02B 6/124* (2013.01); *G02B 6/125* (2013.01); *G02B 6/1228* (2013.01); *G02B 6/136* (2013.01); *G02B 6/14* (2013.01)

(58) Field of Classification Search
CPC ...... G02B 6/1228; G02B 6/125; G02B 6/136; G02B 6/124; G02B 6/14; G02B 6/305
See application file for complete search history.

(56) References Cited

U.S. PATENT DOCUMENTS

| | | | |
|---|---|---|---|
| 6,316,281 B1 | 11/2001 | Lee et al. | |
| 9,671,560 B1* | 6/2017 | Fondeur | ................... G02B 6/14 |
| 10,429,582 B1 | 10/2019 | Bian et al. | |
| 2017/0139132 A1* | 5/2017 | Patel | ................... G02B 6/4206 |

OTHER PUBLICATIONS

Sahin et al., "Methods of Forming a V-Groove for a Fiber Optics Cable on an Integrated Photonics Chip", filed Mar. 3, 2020 as U.S. Appl. No. 16/807,811.
Mu, Xin; Wu, Sailong; Cheng, Lirong; Fu, H.Y. 2020. "Edge Couplers in Silicon Photonic Integrated Circuits: A Review" Appl. Sci. 10, No. 4:1538.

(Continued)

*Primary Examiner* — Michael P Mooney
(74) *Attorney, Agent, or Firm* — Thompson Hine LLP; Anthony Canale

(57) ABSTRACT

Structures including an edge coupler and methods of fabricating a structure including an edge coupler. The structure includes a dielectric layer including an edge, a waveguide core region on the dielectric layer, and multiple segments on the dielectric layer. The waveguide core region has an end surface, and the waveguide core region is lengthwise tapered toward the end surface. The segments are positioned between the waveguide core region and the edge of the dielectric layer. A waveguide core has a section positioned over the waveguide core region in an overlapping arrangement. The waveguide core has an end surface, and the section of the waveguide core is lengthwise tapered toward the end surface.

20 Claims, 11 Drawing Sheets

(56) References Cited

OTHER PUBLICATIONS

Y. Bian, et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.
J. V. Galan et al., "CMOS compatible silicon etched V-grooves integrated with a SOI fiber coupling technique for enhancing fiber-to-chip alignment," 2009 6th IEEE International Conference on Group IV Photonics, San Francisco, CA, 2009, pp. 148-150.
B. Peng, et al., "A CMOS Compatible Monolithic Fiber Attach Solution with Reliable Performance and Self-alignment," in Optical Fiber Communication Conference (OFC) 2020, OSA Technical Digest (Optical Society of America, 2020), paper Th3I.4.
B. Snyder et al., "Ultra-broadband, polarization-insensitive SMF-28 fiber edge couplers for silicon photonics," 2017 IEEE CPMT Symposium Japan (ICSJ), Kyoto, 2017, pp. 55-58.

\* cited by examiner

HYBRID EDGE COUPLERS WITH LAYERS IN MULTIPLE LEVELS

BACKGROUND

The present invention relates to photonics chips and, more specifically, to structures including an edge coupler and methods of fabricating a structure including an edge coupler.

Photonics chips are used in many applications and systems including data communication systems and data computation systems. A photonics chip integrates optical components, such as waveguides, optical switches, edge couplers, and polarizers, and electronic components, such as field-effect transistors, into a unified platform. Among other factors, layout area, cost, and operational overhead may be reduced by the integration of both types of components.

An edge coupler, also known as a spot-size coupler, is commonly used for coupling light of a given mode from an optical fiber to optical components on the photonics chip. The edge coupler may include a section of a waveguide core that defines an inverse taper adjacent to the edge of the photonics chip. Corresponding to a direction of mode propagation, an inverse taper refers to a tapering section of a waveguide core characterized by a gradual increase in width along the mode propagation direction. In the edge coupler construction, the narrow end at the top of the inverse taper is arranged proximate to the optical fiber, and the wide end of the inverse taper is connected with another section of the waveguide core that routes the light away from the edge coupler and to optical components of the photonics chip.

The gradually-varying cross-section area of an inverse taper supports mode transformation and mode size variation associated with mode conversion when light is transferred from the optical fiber to the photonics chip. The narrow end at the tip of the inverse taper is unable to fully confine the incident mode received from the optical fiber because the cross-section area of the tip at its narrow end is smaller than the mode size. Consequently, a significant percentage of the electromagnetic field of the incident mode is distributed about the tip of the inverse taper. As its width increases, the inverse taper can support the entire incident mode and confine the electromagnetic field inside the inverse taper.

Silicon-based edge couplers may suffer from power-dependent losses due to nonlinearity mechanisms attributed to the material silicon. In addition, silicon-based edge couplers may be prone to irreversible damage at high input optical powers because of a combination of an enhanced optical energy density and a change in thermal transmission away from the light path as the inverse taper widens. The inverse taper of the edge coupler may be the most sensitive portion of the edge coupler to being irreversibly damaged.

Improved structures including an edge coupler and methods of fabricating a structure including an edge coupler are needed.

SUMMARY

In an embodiment of the invention, a structure for an edge coupler is provided. The structure includes a dielectric layer having an edge, a waveguide core region on the dielectric layer, and a plurality of segments on the dielectric layer. The waveguide core region has an end surface, and the waveguide core region is lengthwise tapered toward the end surface. The plurality of segments are positioned between the waveguide core region and the edge of the dielectric layer. The structure further includes a waveguide core having a section positioned over the waveguide core region in an overlapping arrangement. The waveguide core has an end surface, and the section of the waveguide core is lengthwise tapered toward the end surface.

In an embodiment of the invention, a method of forming a structure for an edge coupler is provided. The method includes forming a waveguide core region on a dielectric layer, forming a plurality of segments on the dielectric layer, and forming a waveguide core including a section positioned over the waveguide core region in an overlapping arrangement. The plurality of segments are positioned between the waveguide core region and an edge of the dielectric layer. The waveguide core region has an end surface, and the waveguide core region is lengthwise tapered toward the end surface. The waveguide core has an end surface, and the section is lengthwise tapered toward the end surface.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
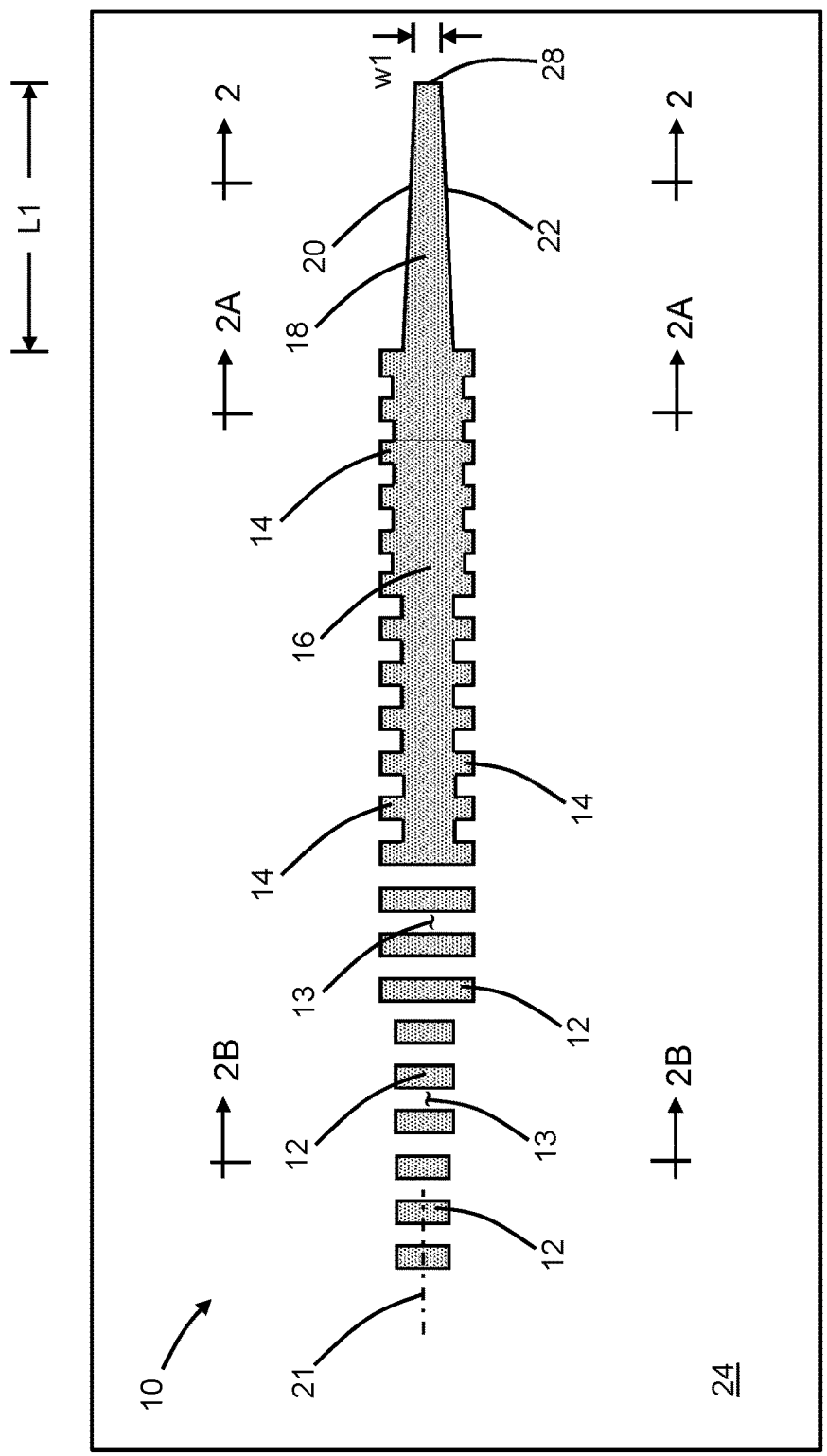
FIG. 1 is a top view of a structure at an initial fabrication stage of a processing method in accordance with embodiments of the invention.

With reference to FIGS. 1, 2, 2A, 2B and in accordance with embodiments of the invention, a structure 10 for an edge coupler includes multiple segments 12, multiple segments 14 and a waveguide core region 16 overlaid with the segments 14, and a tapered waveguide core region 18 adjacent to the segments 14 and waveguide core region 16. The segments 12, the segments 14, the waveguide core region 16, and the tapered waveguide core region 18 may be longitudinally arranged with alignment along a longitudinal axis 21. The segments 14 and waveguide core region 16 are longitudinally positioned between the segments 12 and the tapered waveguide core region 18.

Laser light may be directed from an optical fiber (not shown) toward the structure 10. The laser light may have a given wavelength, intensity, mode shape, and mode size, and the structure 10 provides spot size conversion for the laser light. The gap or space between the optical fiber and the structure 10 may be filled by air or, alternatively, may be filled by an index-matching material or may include a lens. Light propagates within the structure 10 in a direction from the segments 12 toward the tapered waveguide core region 18.

The segments 12, the segments 14, the waveguide core region 16, and the tapered waveguide core region 18 may be positioned over a dielectric layer 24. In an embodiment, the dielectric layer 24 may be comprised of silicon dioxide. In an embodiment, the dielectric layer 24 may be a buried oxide layer of a silicon-on-insulator substrate, and the silicon-on-insulator substrate may further include a handle substrate 26 comprised of a single-crystal semiconductor material (e.g., single-crystal silicon). The segments 12, the segments 14, the waveguide core region 16, and the tapered waveguide core region 18 may be comprised of a single-crystal semiconductor material, such as single-crystal silicon. In an embodiment, the segments 12, the segments 14, the waveguide core region 16, and the tapered waveguide core region 18 may be patterned by lithography and etching processes from a single-crystal silicon device layer of a silicon-on-insulator wafer.

The segments 12 are located in a portion of the structure 10 that initially receives the laser light from the optical fiber. The segments 12 are discrete and disconnected from each other. In that regard, the segments 12 are separated by grooves 13 such that a grating-like structure is defined. The segments 12 may have a width dimension in a direction transverse to the longitudinal axis 21 that varies with position along the longitudinal axis 21.

The segments 14 and waveguide core region 16 are located in a portion of the structure 10 that transfers the laser light from the segments 12 to the tapered waveguide core region 18. The segments 14, which are connected by the waveguide core region 16, may have a width dimension in a direction transverse to the longitudinal axis 21 that varies with position along the longitudinal axis 21. Portions of each segment 14 project outwardly from the opposite side edges of the waveguide core region 16 to provide the variation in the width dimension.

The segments 12, 14 may be positioned at small enough pitch so as not to radiate or reflect light at the wavelength of operation and to act as an effective optical material, and therefore define a metamaterial waveguide. In an embodiment, the pitch and duty cycle of the segments 12 may be uniform to define a periodic arrangement. In alternative embodiments, the pitch and/or the duty cycle of the segments 12 may be apodized (i.e., non-uniform) to define a non-periodic arrangement. In an embodiment, the pitch and duty cycle of the segments 14 may be uniform to define a periodic arrangement. In alternative embodiments, the pitch and/or the duty cycle of the segments 14 may be apodized (i.e., non-uniform) to define a non-periodic arrangement.

The tapered waveguide core region 18 has a sidewall 20 and a sidewall 22 that extend from the intersection with the waveguide core region 16 to an end surface 28. The tapered waveguide core region 18 may be directly connected to the waveguide core region 16. The tapered waveguide core region 18 extends lengthwise along the longitudinal axis 21 from the waveguide core region 16 and terminates at the end surface 28. The tapered waveguide core region 18 has a length L1 that may be measured from the interface with the waveguide core region 16 to the end surface 28.

The tapered waveguide core region 18 has a width dimension that varies with position along the longitudinal axis 21 (i.e., lengthwise tapered) in a direction of light propagation. The width dimension of the tapered waveguide core region 18 increases with increasing distance from the segments 14 and waveguide core region 16, and decreases with decreasing distance from the end surface 28. The tapered waveguide core region 18 has a minimum width w1 occurring at the end surface 28. For example, the tapered waveguide core region 18 may taper from a width of 280 nanometers at the intersection with the waveguide core region 16 to a width of 90 nanometers at the end surface 28. In an embodiment, the width dimension of the tapered waveguide core region 18 may be narrowest at the end surface 28 and vary over its length L1 based on a linear function to provide a trapezoidal shape. In an alternative embodiment, the width dimension of the tapered waveguide core region 18 may be narrowest at the end surface 28 and vary over its length L1 based on a non-linear function, such as a quadratic, parabolic, or exponential function.

Figure 2:
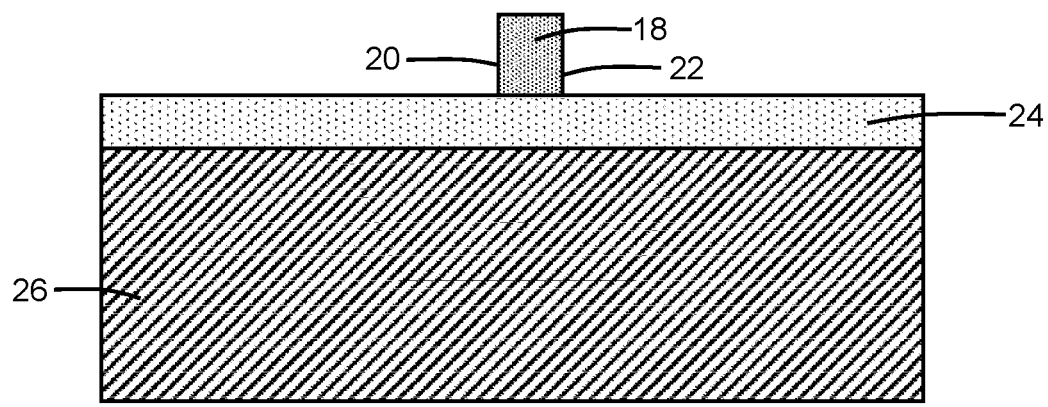
FIG. 2 is a cross-sectional view of the structure taken generally along line 2-2 in FIG. 1.
Figure 2A:
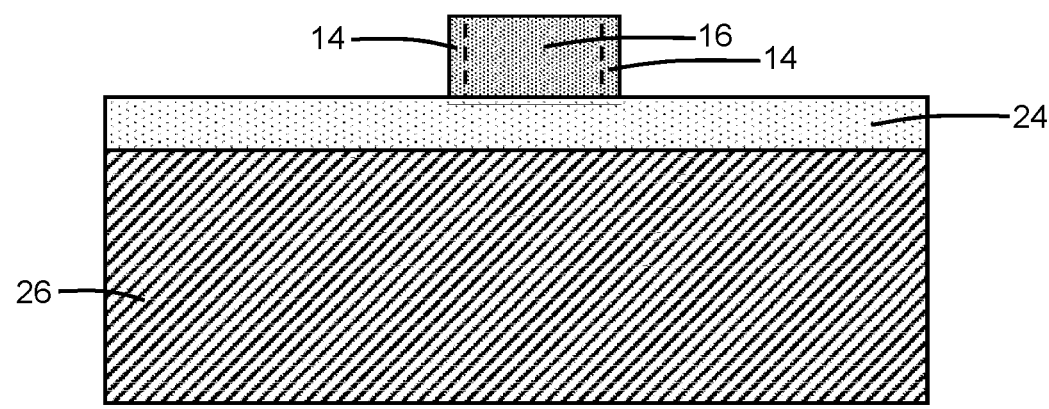
FIG. 2A is a cross-sectional view of the structure taken generally along line 2A-2A in FIG. 1.
Figure 2B:
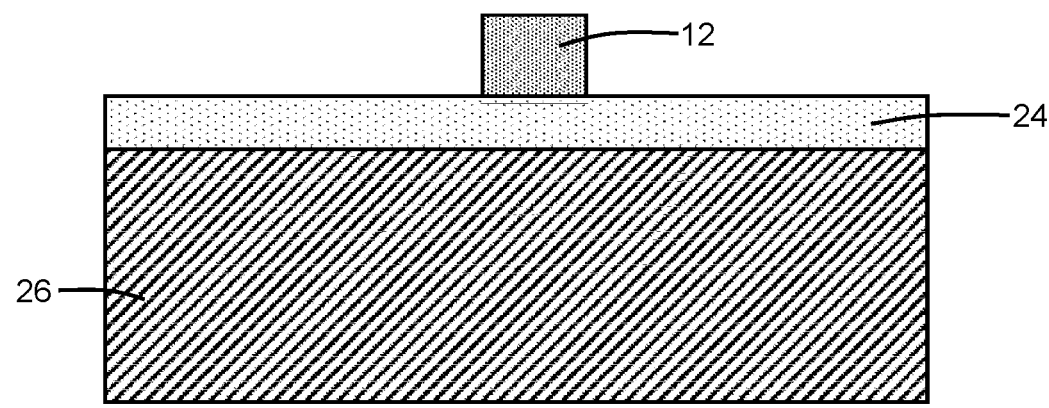
FIG. 2B is a cross-sectional view of the structure taken generally along line 2B-2B in FIG. 1.

With reference to FIGS. 3, 4, 4A, 4B in which like reference numerals refer to like features in FIGS. 1, 2 and at a subsequent fabrication stage, a dielectric layer 30 is formed over the segments 12, the segments 14, the waveguide core region 16, the tapered waveguide core region 18, and dielectric layer 24. The dielectric layer 30 may be comprised of silicon dioxide that may be deposited by chemical vapor deposition and planarized by chemical mechanical polishing.

A waveguide core 32 is positioned on the dielectric layer 30. The waveguide core 32 may be comprised of silicon nitride. The waveguide core 32 includes a tapered section 34 over the tapered waveguide core region 18 and a non-tapered section 33 that is connected to the tapered section 34. The waveguide core 32 extends lengthwise along a longitudinal axis 35 and terminates at an end surface 38. The tapered section 34 may fully overlap with the tapered waveguide core region 18. The tapered section 34 may be positioned to overlap in part with the tapered waveguide core region 18 and to overlap in part with the segments 14 and waveguide core region 16 adjacent to the end surface 38 of the waveguide core 32. In an embodiment, the tapered section 34 of the waveguide core 32 may be centered over the tapered waveguide core region 18. The tapered section 34 has a sidewall 36 and a sidewall 37 that extend from the end surface 38 of the waveguide core 32 to the intersection with the non-tapered section 33. The tapered section 34 has a length L2 that may be measured from the end surface 38 to the interface with the non-tapered section 33. The length L2 of the tapered section 34 may be greater than the length L1 (FIG. 1).

The tapered section 34 may increase in width with increasing distance from the end surface 38. The tapered section 34 has a width dimension that varies with position along the longitudinal axis 35. The tapered section 34 gradually becomes wider in a direction along the longitudinal axis 35 with increasing distance from the end surface 38 and has a minimum width w2 occurring at the end surface 38. For example, the tapered section 34 may inversely taper from a width of 120 nanometers at the end surface 38 to a width of 800 nanometers at the end of the tapering. In an embodiment, the tapered section 34 defines an inverse taper that is tapered in the opposite direction with respect to the tapering of the tapered waveguide core region 18. As used herein, an inverse taper is a tapered section of a waveguide core with a gradual increase in width along the propagation direction of the light. In an embodiment, the width dimension of the tapered section 34 may be narrowest at the end surface 38 and vary over its length L2 based on a linear function to provide a trapezoidal shape. In an alternative embodiment, the width dimension of the tapered section 34 may be narrowest at the end surface 38 and vary over its length L2 based on a non-linear function, such as a quadratic, parabolic, or exponential function. In an embodiment, the width dimension of the tapered section 34 may be greater than the width dimension of the tapered waveguide core region 18 at any longitudinal position over which overlap exists.

Figure 3:
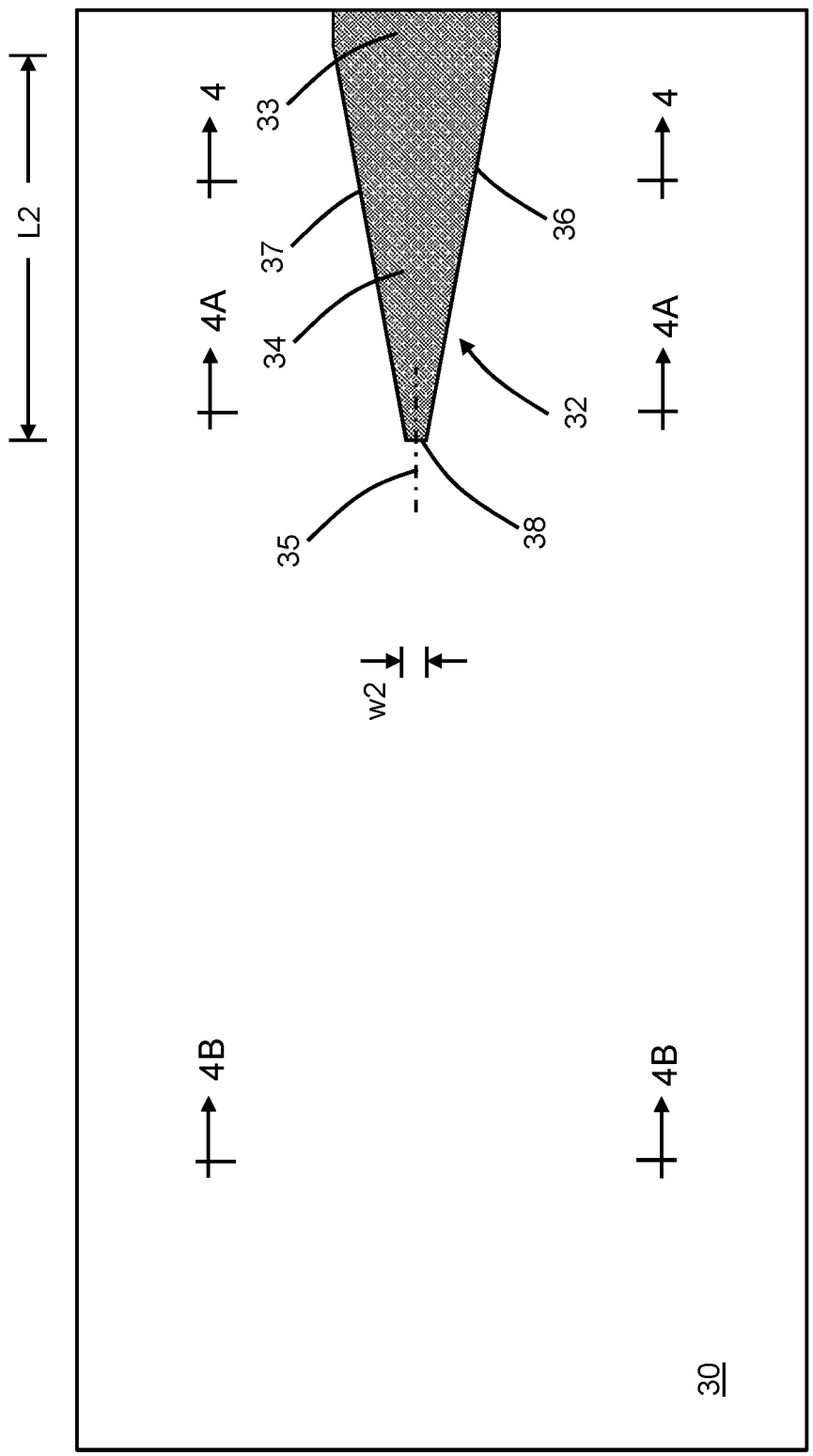
FIG. 3 is a top view of the structure at a fabrication stage of the processing method subsequent to FIG. 1.
Figure 4:
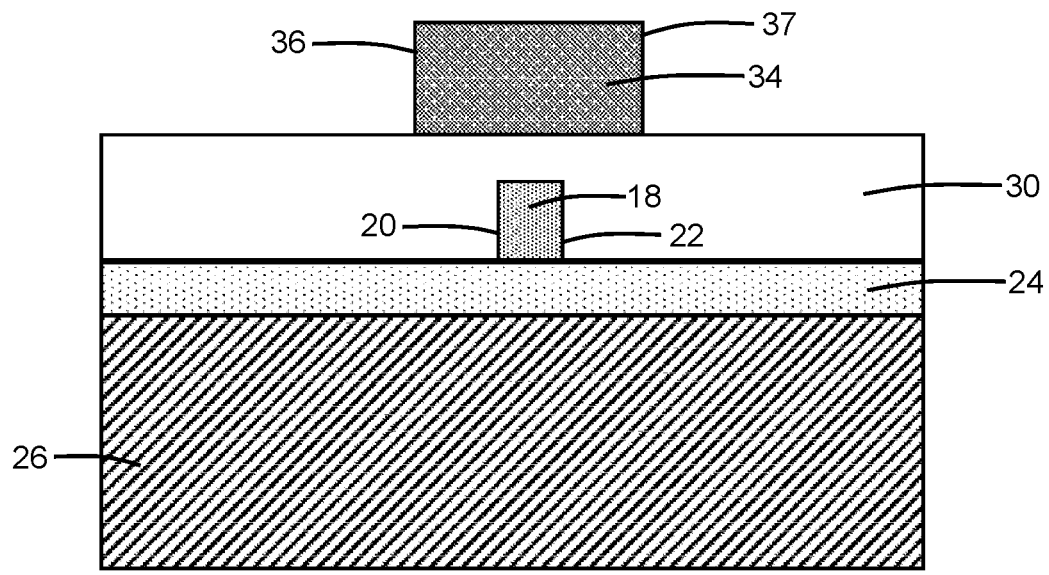
FIG. 4 is a cross-sectional view of the structure taken generally along line 4-4 in FIG. 3.
Figure 4A:
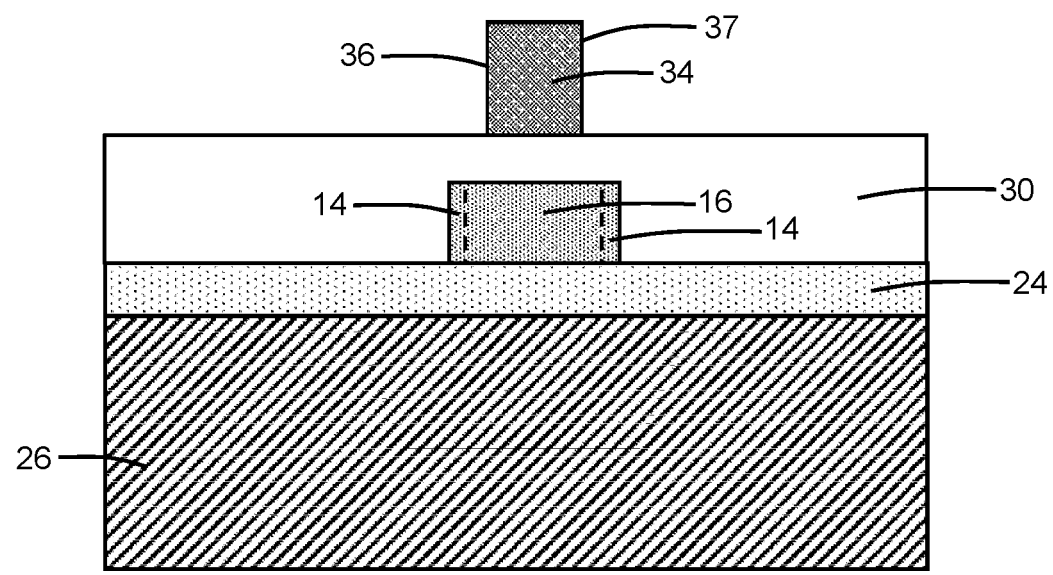
FIG. 4A is a cross-sectional view of the structure taken generally along line 4A-4A in FIG. 3.
Figure 4B:
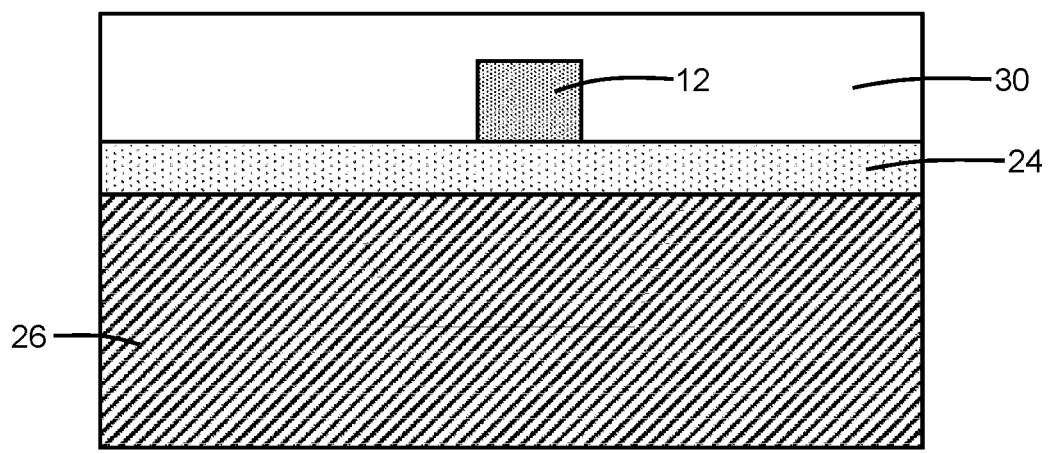
FIG. 4B is a cross-sectional view of the structure taken generally along line 4B-4B in FIG. 3.
Figure 5:
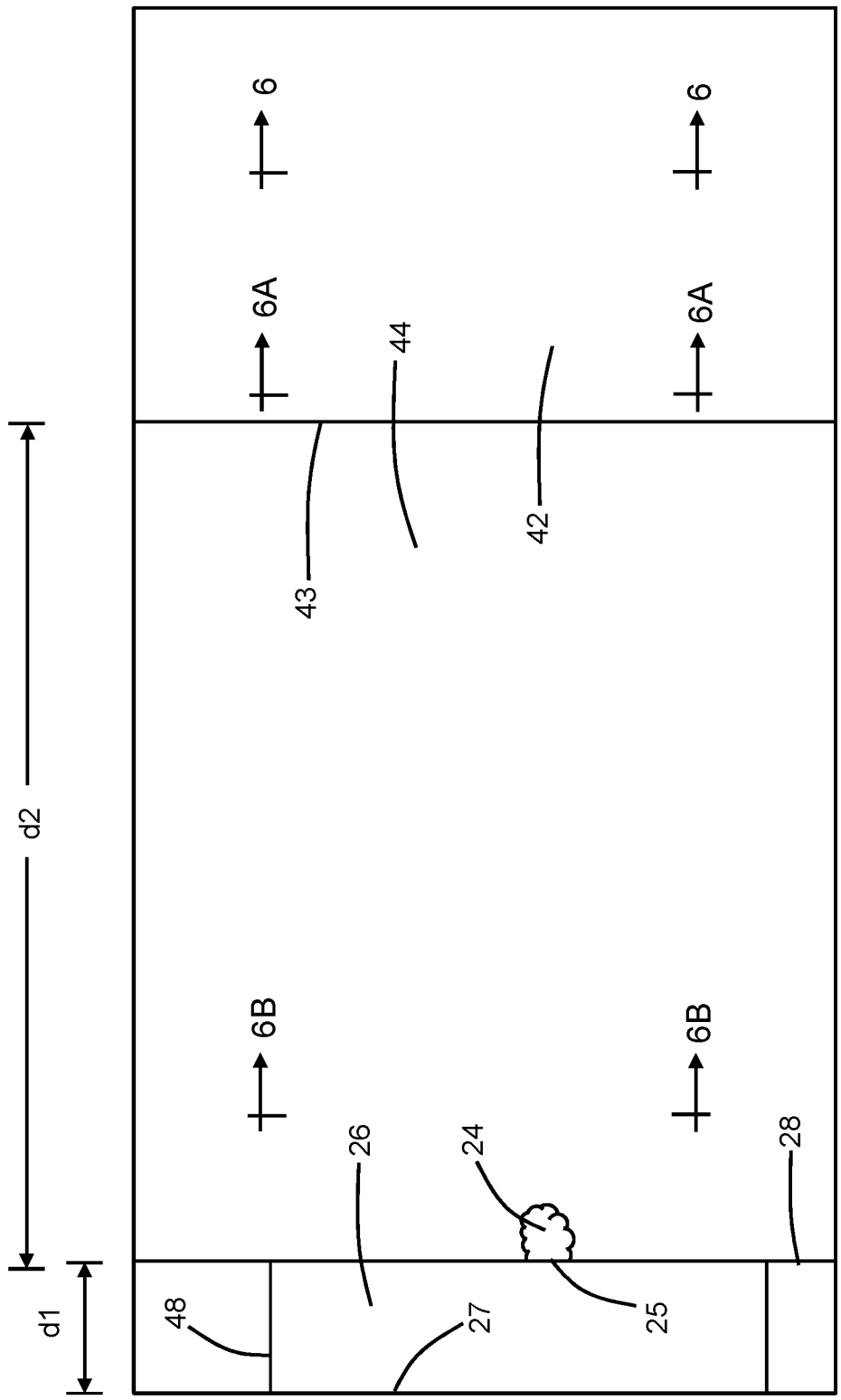
FIG. 5 is a top view of the structure at a fabrication stage of the processing method subsequent to FIG. 3.
Figure 6:
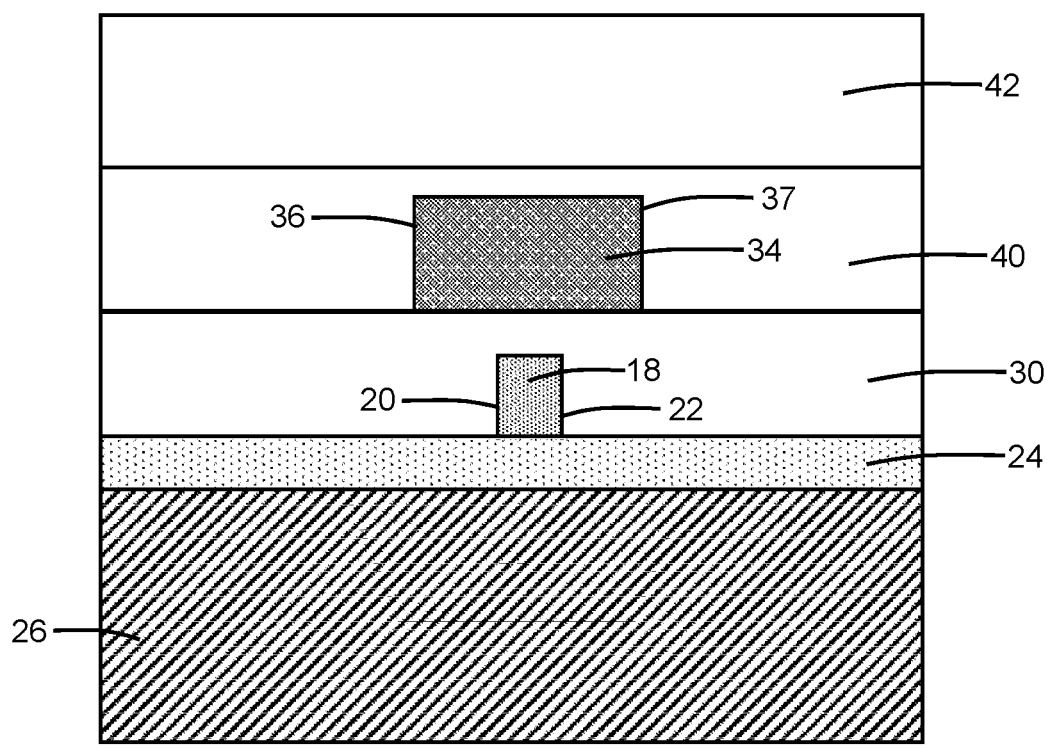
FIG. 6 is a cross-sectional view of the structure taken generally along line 6-6 in FIG. 5.
Figure 6A:
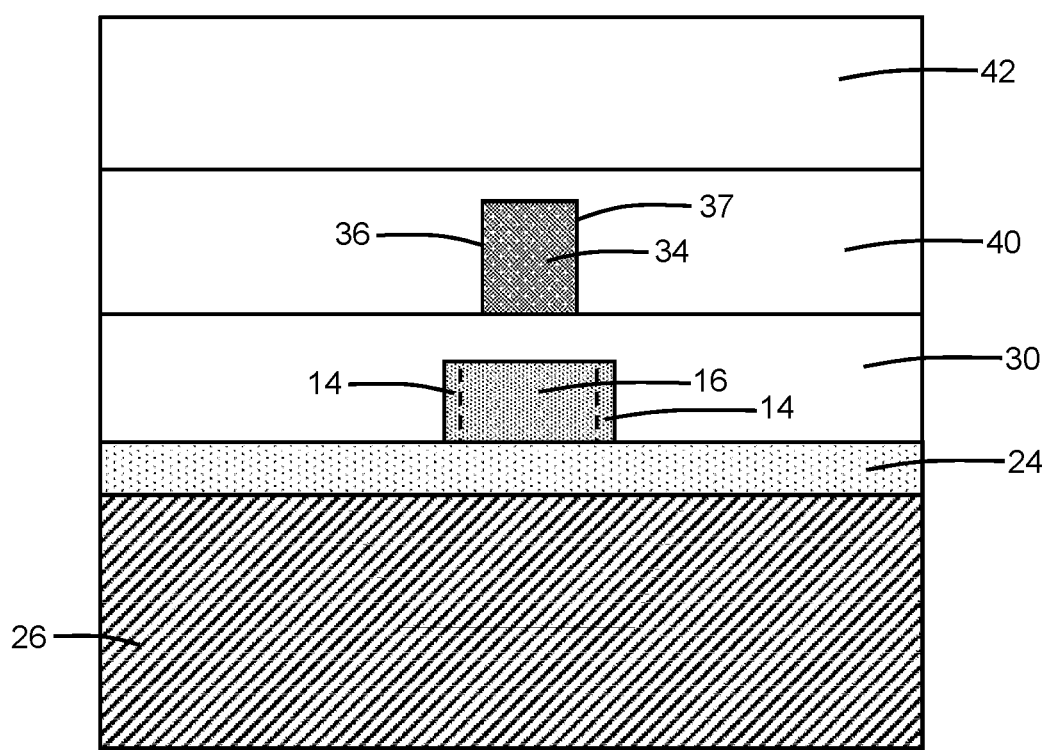
FIG. 6A is a cross-sectional view of the structure taken generally along line 6A-6A in FIG. 5.
Figure 6B:
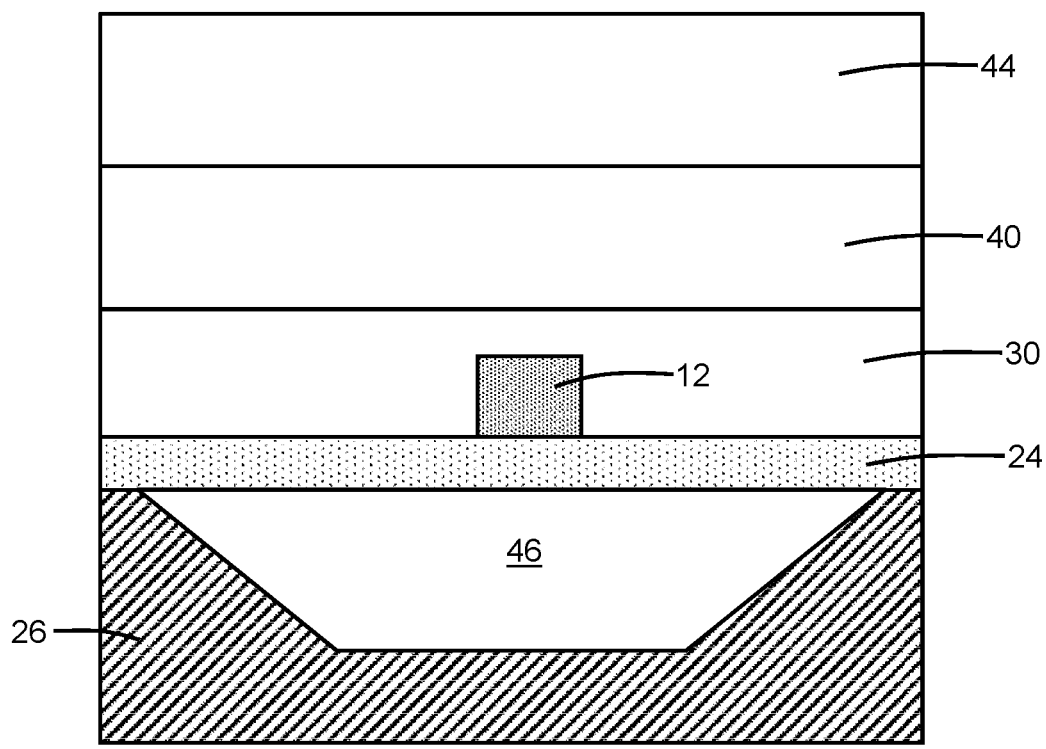
FIG. 6B is a cross-sectional view of the structure taken generally along line 6B-6B in FIG. 5.

With reference to FIGS. 5, 6, 6A, 6B in which like reference numerals refer to like features in FIGS. 3, 4 and at a subsequent fabrication stage, a dielectric layer 40 is formed over the dielectric layer 30 and waveguide core 32. The dielectric layer 40 may be comprised of silicon dioxide deposited by chemical vapor deposition and planarized by chemical mechanical polishing. A back-end-of-line stack 42 including a stack of interlayer dielectric layers is formed over the dielectric layer 40, and a portion of the back-end-of-line stack 42 proximate to the structure 10 is removed and replaced by a dielectric layer 44. The dielectric layer 44 may be comprised of silicon dioxide deposited by chemical vapor deposition and planarized by chemical mechanical polishing. The back-end-of-line stack 42 and the dielectric layer 44 converge along an interface 43 at which a transition occurs from the interlayer dielectric layers of the back-end-of-line stack 42 to the dielectric layer 44. The end surface 38 of the waveguide core 32 may be coextensive (i.e., share a boundary) with the interface 43.

A groove 46 is formed in the handle substrate 26 that extends from an edge 27 of the handle substrate 26 to an edge 25 of the dielectric layer 24 and then further extends beneath the dielectric layer 24 and a portion of the structure 10 as an undercut. The edge 25 represents a side surface at a boundary of the dielectric layer 24. The edge 27 represents a surface at a boundary of the handle substrate 26 that is horizontally spaced by a distance d from the edge 25 of the dielectric layer 24. The edge 27 is also horizontally spaced by a distance d2 from the interface 43.

The groove 46 may be formed by a multiple-step process. Lithography and etching processes may be used to form a rectangular opening that extends through the dielectric layers 24, 30, 40 and into the handle substrate 26 between the edges 25, 27, and to also form holes (not shown) extending through the dielectric layers 24, 30, 40 and into the handle substrate 26 adjacent to the structure 10. The formation of the rectangular opening defines the edge 25 of the dielectric layer 24. The rectangular opening in the handle substrate 26 may then be masked with a resist, and the handle substrate 26 beneath the portion of the structure 10 may be etched through the holes by an etching process using, for example, a sulfur hexafluoride plasma to provide an initial undercut. After removing the resist, a wet chemical etchant may be used to provide the portion of the groove 46 between the edges 25, 27 and the portion of the groove 46 providing the undercut with a V-shape or U-shape. The wet chemical etchant may exhibit selectivity with respect to crystal orientation of the semiconductor material of the handle substrate 26 and may be characterized by different etching rates along different crystalline directions, which produces the V-shape or U-shape. For example, the wet chemical etchant may be a solution containing tetramethylammonium hydroxide (TMAH).

A portion of the groove 46 in the handle substrate 26 is positioned adjacent to the edge 25 of the dielectric layer 24 and, therefore, is positioned adjacent to the structure 10. A tip of an optical fiber may be inserted and supported at least in part by the sidewalls of the portion of the groove 46 that is adjacent to the structure 10. A low-index adhesive may be used to assemble the tip of the optical fiber and may fill all or part of the groove 46. A portion of the groove 46 is positioned beneath a portion of the structure 10, and a portion of the dielectric layer 24 is positioned between the groove 46 and the structure 10. The portion of the dielectric layer 24 located over the groove 46 defines a membrane that is undercut by the groove 46.

The structure 10, in any of its embodiments described herein, may be integrated into a photonics chip that includes electronic components and additional optical components. For example, the electronic components may include field-effect transistors that are fabricated by CMOS processing.

The structure 10 for the edge coupler includes an intrinsic transition between tapered waveguide core region 18 and the tapered section 34 that are located in different levels in elevation over the dielectric layer 24. The structure 10 for the edge coupler has a hybrid construction includes materials of different composition that are located in the different levels. The incorporation of the multi-level transition between the tapered waveguide core region 18 and the tapered section 34 within the structure 10 may provide for rapid mode conversion, and provide for improved power handling such that the tapered waveguide core region 18 is less prone to damage. The introduction of a material other than silicon in the structure 10 may reduce power-dependent losses during the transfer of optical power from the optical fiber by the structure to the optical components on the photonics chip.

Figure 7:
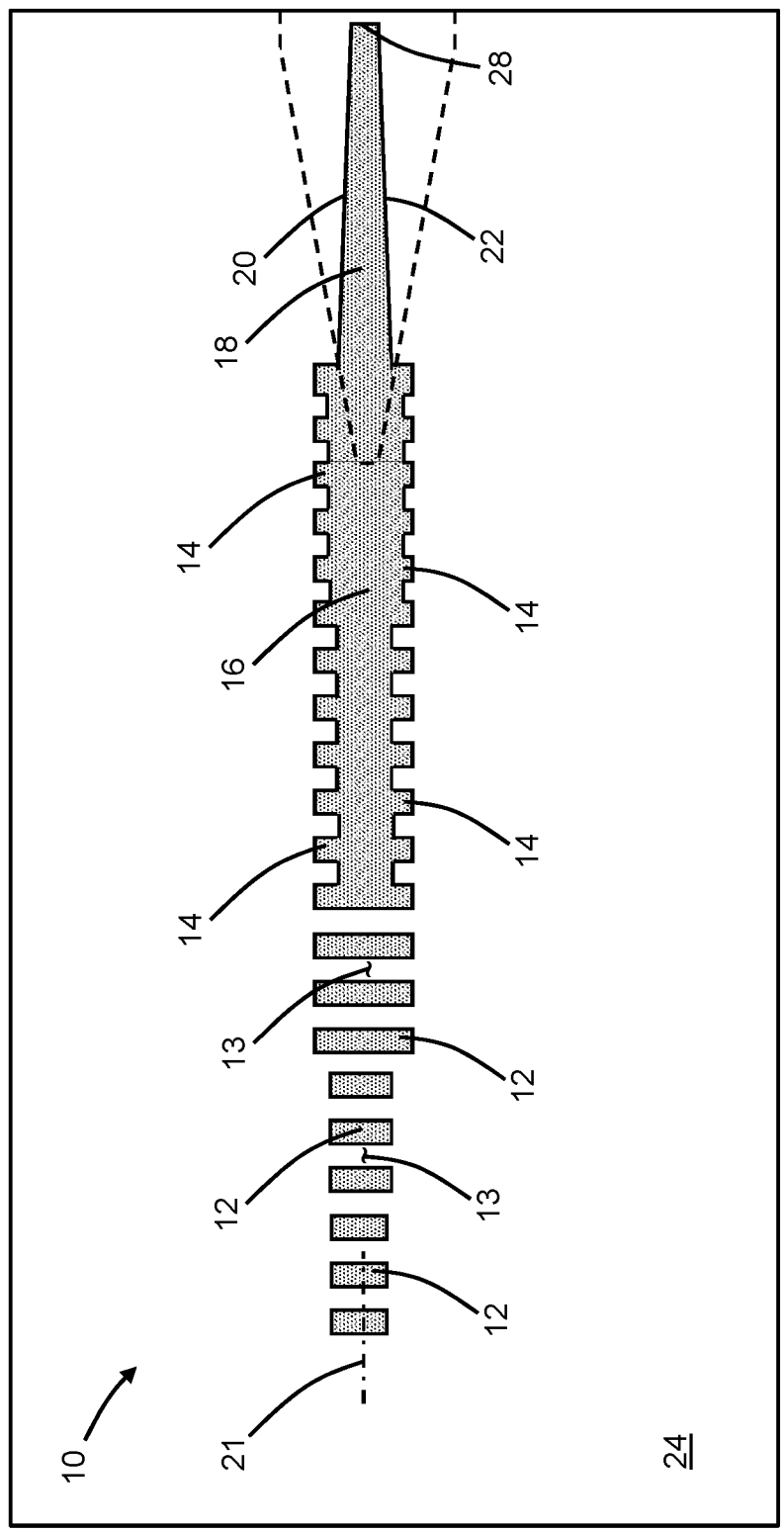
FIG. 7 is a top view of a structure in accordance with alternative embodiments of the invention.

With reference to FIG. 7 in which like reference numerals refer to like features in FIG. 1 and in accordance with alternative embodiments of the invention, the tapered waveguide core region 18 may be modified to extend in length along the longitudinal axis 21 past the tapered section 34 of the waveguide core 32 such that a portion of the tapered waveguide core region 18 is overlapped by the tapered section 34 of the waveguide core 32 and a different portion of the tapered waveguide core region 18 is overlapped by the non-tapered section 33 of the waveguide core 32. The end surface 28 of the extended tapered waveguide core region 18 is positioned beneath the non-tapered section 33 of the waveguide core 32 instead of being positioned beneath the tapered section 34 of the waveguide core 32.

Figure 8:
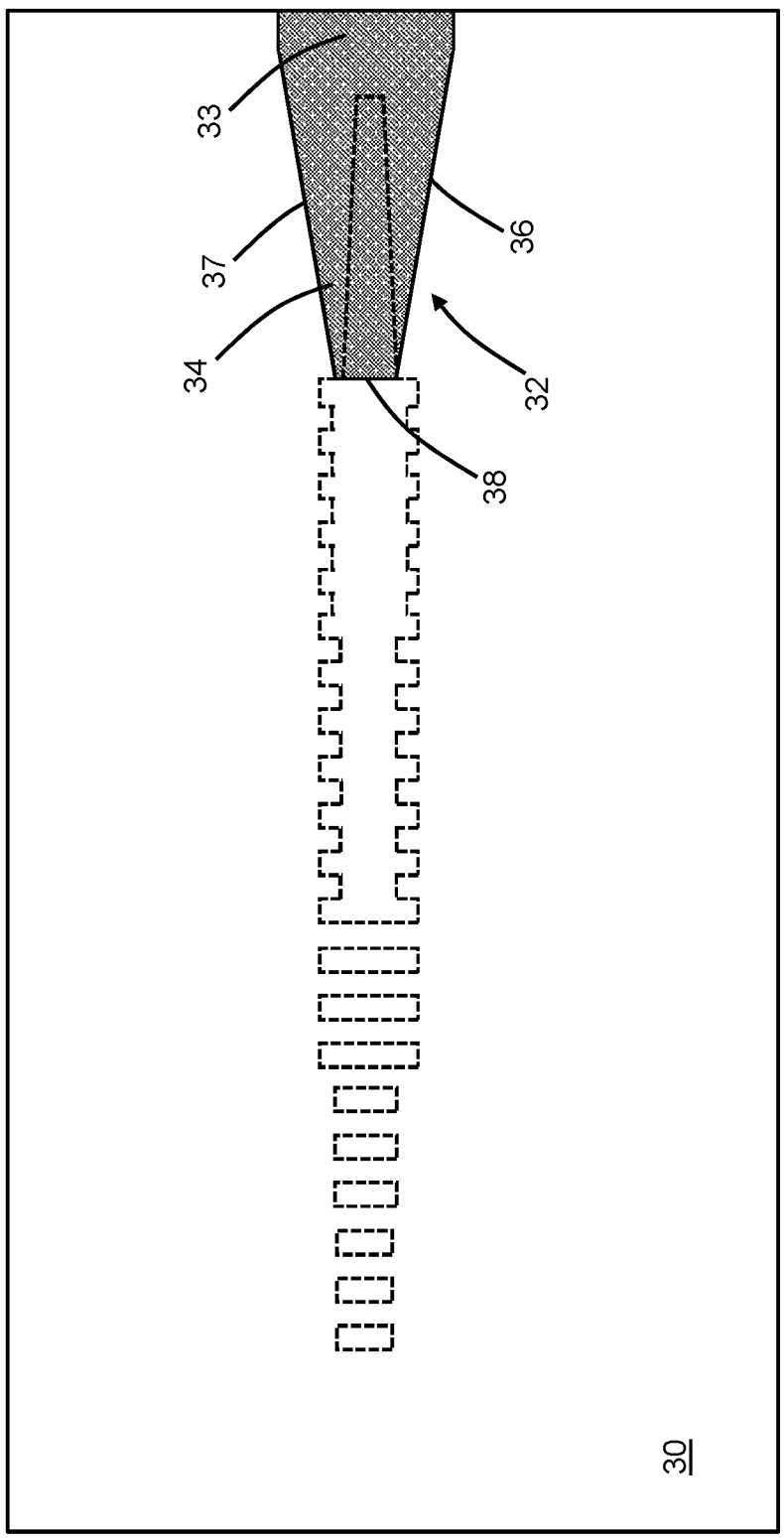
FIG. 8 is a top view of a structure in accordance with alternative embodiments of the invention.

With reference to FIG. 8 in which like reference numerals refer to like features in FIG. 3 and in accordance with alternative embodiments of the invention, the tapered section 34 of the waveguide core 32 may be modified such that the end surface 38 is positioned over the tapered waveguide core region 18 instead of over the segments 14 and waveguide core region 16. In an embodiment, the end surface 38 may be positioned directly over the transition from the segments 14 and waveguide core region 16 to the tapered waveguide core region 18. The end surface 38 is offset longitudinally from the segments 14 and waveguide core region 16 with overlap absent.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an edge coupler, the structure comprising:
    a first dielectric layer including an edge;
    a first waveguide core region on the first dielectric layer, the first waveguide core region having an end surface, and the first waveguide core region being lengthwise tapered toward the end surface;
    a plurality of segments on the first dielectric layer, the plurality of segments positioned between the first waveguide core region and the edge of the first dielectric layer;
    a waveguide core including a first section positioned over the first waveguide core region in an overlapping arrangement, the waveguide core having an end surface, and the first section being lengthwise tapered toward the end surface;
    a back-end-of-line stack over the waveguide core; and
    a second dielectric layer having an interface with the back-end-of-line stack, the second dielectric layer extending from the interface to the edge of the first dielectric layer,
    wherein the end surface of the waveguide core is coextensive with the interface.

2. The structure of claim 1 wherein the first section of the waveguide core is centered over the first waveguide core region.

3. The structure of claim 1 wherein the waveguide core comprises silicon nitride, and the first waveguide core region and the plurality of segments comprise single-crystal silicon.

4. The structure of claim 1 wherein the end surface of the first waveguide core region is positioned beneath the first section of the waveguide core.

5. The structure of claim 4 further comprising:
    a second waveguide core region that is overlaid with the plurality of segments, the second waveguide core region connected to the first waveguide core region,
    wherein the end surface of the waveguide core is positioned over the second waveguide core region and the plurality of segments.

6. The structure of claim 4 further comprising:
    a second waveguide core region that is overlaid with the plurality of segments, the second waveguide core region connected to the first waveguide core region
    wherein the end surface of the waveguide core that is positioned over the first waveguide core region.

7. The structure of claim 1 further comprising:
    a second waveguide core region that is overlaid with the plurality of segments, the second waveguide core region connected to the first waveguide core region,
    wherein the end surface of the waveguide core is positioned over the second waveguide core region and the plurality of segments.

8. The structure of claim 1 further comprising:
    a second waveguide core region that is overlaid with the plurality of segments, the second waveguide core region connected to the first waveguide core region
    wherein the end surface of the waveguide core is positioned over the first waveguide core region.

9. The structure of claim 1 wherein the first waveguide core region and the plurality of segments comprise silicon, the waveguide core comprises silicon nitride, and further comprising:
    a third dielectric layer positioned between the first waveguide core region and the first section of the waveguide core.

10. The structure of claim 1 wherein the first dielectric layer is positioned on a substrate, and the substrate includes a groove that extends beneath the edge of the first dielectric layer and beneath the plurality of segments.

11. The structure of claim 1 wherein the first waveguide core region and the first section of the waveguide core are tapered in opposite directions.

12. The structure of claim 1 wherein the plurality of segments and the first waveguide core region are aligned along a longitudinal axis, and the plurality of segments are spaced apart along the longitudinal axis.

13. The structure of claim 1 wherein the interface and the end surface of the waveguide core are positioned over the plurality of segments.

14. The structure of claim 1 wherein the waveguide core includes a second section adjoined to the first section, the first section is positioned between the second section and the end surface of the waveguide core, and the end surface of the first waveguide core region is positioned beneath the second section of the waveguide core.

15. A method of forming a structure for an edge coupler, the method comprising:

forming a first waveguide core region on a first dielectric layer, wherein the first waveguide core region has an end surface, and the first waveguide core region is lengthwise tapered toward the end surface;

forming a plurality of segments on the first dielectric layer, wherein the plurality of segments are positioned between the first waveguide core region and an edge of the first dielectric layer;

forming a waveguide core including a section positioned over the first waveguide core region in an overlapping arrangement, wherein the waveguide core has an end surface, and the section is lengthwise tapered toward the end surface;

forming a back-end-of-line stack over the waveguide core;

removing a first portion of the back-end-of-line stack; and forming a second dielectric layer having an interface with a second portion of the back-end-of-line stack, wherein the second dielectric layer extends from the interface to the edge of the first dielectric layer, and the end surface of the waveguide core is coextensive with the interface.

16. The method of claim 15 wherein the end surface of the first waveguide core region is positioned beneath the section of the waveguide core.

17. The method of claim 15 further comprising:

forming a second waveguide core region that is overlaid with the plurality of segments, the second waveguide core region connected to the first waveguide core region, wherein the end surface of the waveguide core is positioned over the second waveguide core region and the plurality of segments.

18. The method of claim 15 further comprising:

forming a second waveguide core region that is overlaid with the plurality of segments, the second waveguide core region connected to the first waveguide core region wherein the end surface of the waveguide core is positioned over the first waveguide core region.

19. The structure of claim 1 wherein the waveguide core comprises silicon nitride.

20. The structure of claim 1 wherein the first waveguide core region and the plurality of segments comprise single-crystal silicon.

* * * * *